(12) United States Patent
Phillips

(10) Patent No.: US 12,062,940 B2
(45) Date of Patent: *Aug. 13, 2024

(54) PATCH PANEL FOR PROGRAMMING A SPLIT BUS ELECTRICAL PANEL FOR PARTIAL OR FULL BACKUP WITH PV AND BATTERY SYSTEMS

(71) Applicant: Schneider Electric USA, Inc., Andover, MA (US)

(72) Inventor: Timothy Phillips, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,885

(22) Filed: Dec. 28, 2022

(65) Prior Publication Data

US 2023/0133091 A1   May 4, 2023

Related U.S. Application Data

(63) Continuation of application No. 17/201,455, filed on Mar. 15, 2021, now Pat. No. 11,545,850.

(60) Provisional application No. 63/093,903, filed on Oct. 20, 2020.

(51) Int. Cl.
*H02J 7/35* (2006.01)
*H02J 3/38* (2006.01)
*H02S 40/38* (2014.01)

(52) U.S. Cl.
CPC ............... *H02J 7/35* (2013.01); *H02J 3/381* (2013.01); *H02S 40/38* (2014.12)

(58) Field of Classification Search
CPC ..... H02J 7/35; H02J 3/38; H02J 3/381; H02S 40/38

See application file for complete search history.

(56) References Cited

U.S. PATENT DOCUMENTS

| | | | |
|---|---|---|---|
| 7,599,171 B1 | 10/2009 | Remmert | |
| 11,545,850 B2 * | 1/2023 | Phillips | ................... H02J 3/381 |
| 2009/0058191 A1 | 3/2009 | Nordman et al. | |
| 2012/0181872 A1 | 7/2012 | Lim et al. | |
| 2018/0037121 A1 | 2/2018 | Narla | |

OTHER PUBLICATIONS

Extended European Search Report dated Mar. 22, 2022 for corresponding European Patent Application No. 21203653.7-1202, 10 pages.

* cited by examiner

*Primary Examiner* — Robert L Deberadinis
(74) *Attorney, Agent, or Firm* — Locke Lord LLP

(57) ABSTRACT

An apparatus provides a single split-bus electrical panel with a first panel section that supplies power to non-critical loads and a second panel section to supply photoelectric power to critical loads. A patch panel associated with the split-bus electrical panel is configured to enable an installer to selectively connect factory installed connections to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

16 Claims, 13 Drawing Sheets

PATCH PANEL FOR PROGRAMMING A SPLIT BUS ELECTRICAL PANEL FOR PARTIAL OR FULL BACKUP WITH PV AND BATTERY SYSTEMS

CROSS-REFERENCE TO RELATED APPLICATIONS

The present application is a continuation of U.S. patent application Ser. No. 17/201,455 filed on Mar. 15, 2021, which claims the benefit of and priority to U.S. Provisional Patent Application Ser. No. 63/093,903 filed on Oct. 20, 2020, the contents of which are incorporated by reference herein in their entirety.

TECHNICAL FIELD

The present disclosure relates to residential electrical panels for providing full or partial back-up of a photovoltaic system to power critical loads during a utility power outage.

BACKGROUND

When an electrical utility outage occurs, critical loads such as pumps, security systems, refrigerators and electronics should ideally have an auxiliary source of power available. In residential applications, photovoltaic (PV) systems with battery back-up are available to provide limited auxiliary power, which is typically at a lower power level than is available from the utility. Thus, some means is required to allocate the reduced power to the critical loads. The installation of typical residential PV systems requires a separate back-up panel for the critical loads, so that the critical loads must be relocated to the separate back-up panel.

In typical residential photovoltaic/battery back-up systems, a decision needs to be made prior to installation of the system, as to whether a partial back-up system or full back-up system will be provided for the home. Once the choice is made to install either the partial back-up system or full back-up system, it would require significant labor to reconstruct and rewire the system if the choice of systems were to change.

What is needed is a convenient way for the installer implement either a partial back-up system or full back-up system at the time the home is being built, and moreover, to enable an electrician to later change the system, if desired by the home owner.

SUMMARY

In accordance with one example embodiment described herein, an apparatus provides a single split-bus electrical panel with back-feed circuit breakers. Two panel sections of the single split bus electrical panel may be selectively powered by a utility power source, a back-up photovoltaic power source, or a combination of the utility power source and the photovoltaic power source. A patch panel is associated with or a part of the split-bus electrical panel, which includes a plurality of wire termination locations, which facilitates making changes between a fully backed up system and a partially backed-up system. The patch panel is configured to enable an installer to selectively connect factory installed connections to the back-feed circuit breakers to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

The back-feed circuit breakers are arranged to allow connection of the microgrid interconnection device for isolation of a critical loads section from a standards loads section during back-up operation due to a utility power outage. The first panel section of the split-bus electrical panel may be selectively connected to a utility power source to supply power to non-critical standards loads. The second panel section of the split-bus electrical panel may be selectively connected to a photovoltaic power source to supply power to critical loads in a residence when there is a power outage. The second panel section may be selectively connected through a relay in the microgrid interconnection device to the utility power source, in parallel with the first panel section, to supply both utility power and photovoltaic power when there is no outage. The relay is configured to isolate the second panel when there is a utility power outage.

In accordance with one example embodiment described herein, an apparatus for providing full or partial back-up power of a residential photovoltaic system to power critical residential loads during a utility power outage, comprises:

a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;

a first circuit breaker in the first panel section connected to a first bus bar and a second bus bar of the first panel section, and connected to a first pair of wire terminations, the first circuit breaker configured to conduct power from a power source connected via the first pair of wire terminations;

a second circuit breaker in the second panel section connected to a first bus bar and a second bus bar of the second panel section, and connected to a second pair of wire terminations, the second circuit breaker configured to conduct power from a power source via the second pair of wire terminations; and a power wiring patch panel associated with the split-bus electrical panel, including a plurality of wire termination locations interconnected by a plurality of factory installed connections in the patch panel, the patch panel configured to enable an installer to selectively connect the first and second pairs of wire terminations to selected wire termination locations of the patch panel to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

In accordance with one example embodiment described herein, the patch panel has a first wire termination location 1 connected to an L1 phase of a split phase utility power source, and a second wire termination location 2 connected to an L2 phase of the split phase utility power source;

wherein the patch panel is configured to connect the first wire termination location 1 to third 3 and fourth 11 wire termination locations and configured to connect the second wire termination location 2 to fifth 4 and sixth 12 wire termination locations;

wherein the patch panel is configured to connect an L1 phase wire termination 109 of the first circuit breaker 110A to the third wire termination location 3 of the patch panel and to connect an L2 wire termination 111 of the first circuit breaker to the fifth wire termination location 4 of the patch panel, to conduct power from the utility power source to the first panel section 102A;

wherein the patch panel is configured to connect an L1 phase wire termination 113 of the second circuit breaker 110B to a seventh wire termination location 6 of the patch panel and to connect an L2 wire termination 115 of the second circuit breaker to an eighth wire termination location 8 of the patch panel;

wherein the patch panel is configured to connect the seventh wire termination location 6 to a ninth wire termination location 10 and to connect the eighth wire termination location 8 to a tenth wire termination location 9;

wherein the patch panel is configured to conduct power from the utility power source to the second panel section 102B, by a first shorting wire 114' between the fourth wire termination location 11 and the ninth wire termination location 10 of the patch panel, and by a second shorting wire 112' between the sixth wire termination location 12 and the tenth wire termination location 9 of the patch panel, to connect each panel section to normal utility power, but without solar power back-up when there is a utility outage.

In accordance with one example embodiment described herein, the patch panel is configured to enable an installer to selectively connect the second panel section 102B to the utility power via first and second relay switches A and B of a relay 118 in a microgrid interconnection device 116 when the second panel section is presently at least partially powered by back-up photovoltaic power, by enabling the installer to selectively remove the first and second shorting wires from the patch panel and enable the installer to connect a first relay switch A between the fourth wire termination 11 location and the ninth wire termination location 10 of the patch panel, and by enabling the installer to selectively connect a second relay B between the sixth wire termination location 12 and the tenth wire termination location 9 of the patch panel, for partial power back-up of the split-bus panel by powering the first panel section only with utility power and by powering the second panel section with utility power that is backed up with photovoltaic power when there is a utility outage.

In accordance with one example embodiment described herein, the first and second relay switches in the microgrid interconnection device are coupled to the utility power source and configured to be closed and conduct utility power from the utility power source when there is no utility power outage and to be open when there is a utility power outage.

In accordance with one example embodiment described herein, the patch panel is configured to connect an eleventh wire termination location 5 of the patch panel to the ninth wire termination location 10 and to connect a twelfth wire termination location 7 of the patch panel to the tenth wire termination location 9;

wherein the patch panel is configured to enable an installer to selectively move the L1 phase wire termination 109 of the first circuit breaker 110A from the third wire termination location 3 and to connect the L1 phase wire termination 109 of the first circuit breaker 110A to the eleventh wire termination location 5 of the patch panel and to move the L2 wire termination 111 of the first circuit breaker from the fifth wire termination location 4 to the twelfth wire termination location 7 of the patch panel, to conduct power from the photovoltaic power source and from the utility power source to the first panel section 102A, for full power back-up of the split-bus panel by powering both the first panel section and the second panel section with utility power that is backed up with photovoltaic power when there is a utility outage.

In accordance with one example embodiment described herein, the back-up system includes a back-up power source that includes a rechargeable battery, a charger, an inverter, and an outage detector that is configured to detect when there is a utility power outage and send an outage signal to the relay.

In accordance with one example embodiment described herein, an outage detector is associated with the microgrid connection device and is configured to detect whether there is a utility power outage and to cause a relay to open when a utility power outage is detected.

In accordance with one example embodiment described herein, system for providing full or partial back-up power of a residential photovoltaic system to power critical residential loads during a utility power outage, comprises:

a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;

a first circuit breaker in the first panel section connected to a first bus bar and a second bus bar of the first panel section, and connected to a first pair of wire terminations, the first circuit breaker configured to conduct power from a power source connected via the first pair of wire terminations;

a second circuit breaker in the second panel section connected to a first bus bar and a second bus bar of the second panel section, and connected to a second pair of wire terminations, the second circuit breaker configured to conduct power from a power source via the second pair of wire terminations; and a power wiring patch panel associated with the split-bus electrical panel, including a plurality of wire termination locations interconnected by a plurality of factory installed connections in the patch panel, the patch panel configured to enable an installer to selectively connect the first and second wire terminations to selected wire termination locations of the patch panel to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

The resulting apparatus and system connect the two panel sections of the split bus in parallel, providing a convenient way for the installer implement either a partial back-up system or full back-up system at the time the home is being built, and moreover, to enable an electrician to later change the system, if desired by the home owner.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
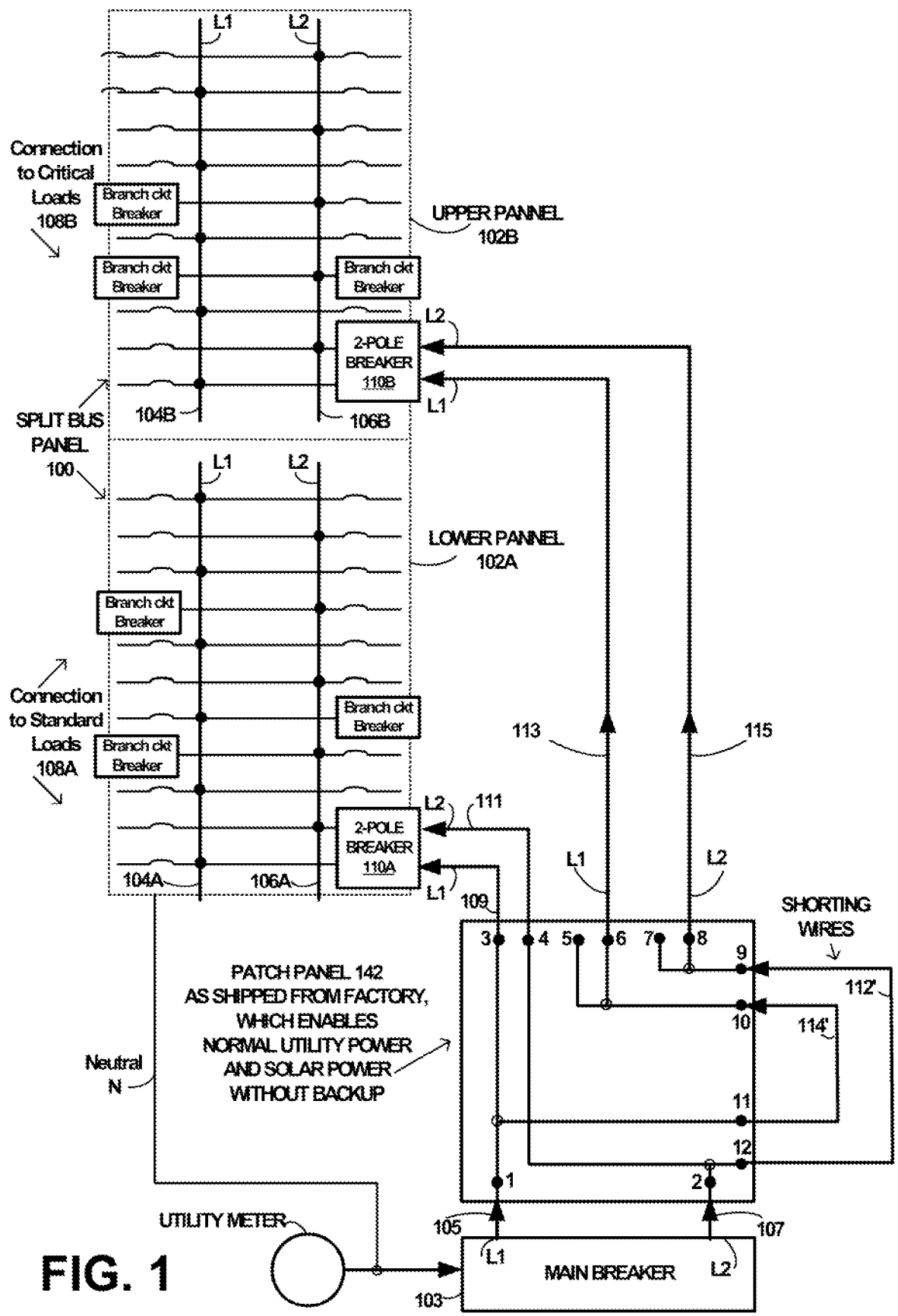
FIG. 1 is circuit and functional block diagram of a single split-bus electrical panel with back-feed circuit breakers protecting two sections of the single split bus electrical panel. The patch panel is shown as shipped from factory, which enables normal utility power and solar power without backup.
Figure 2:
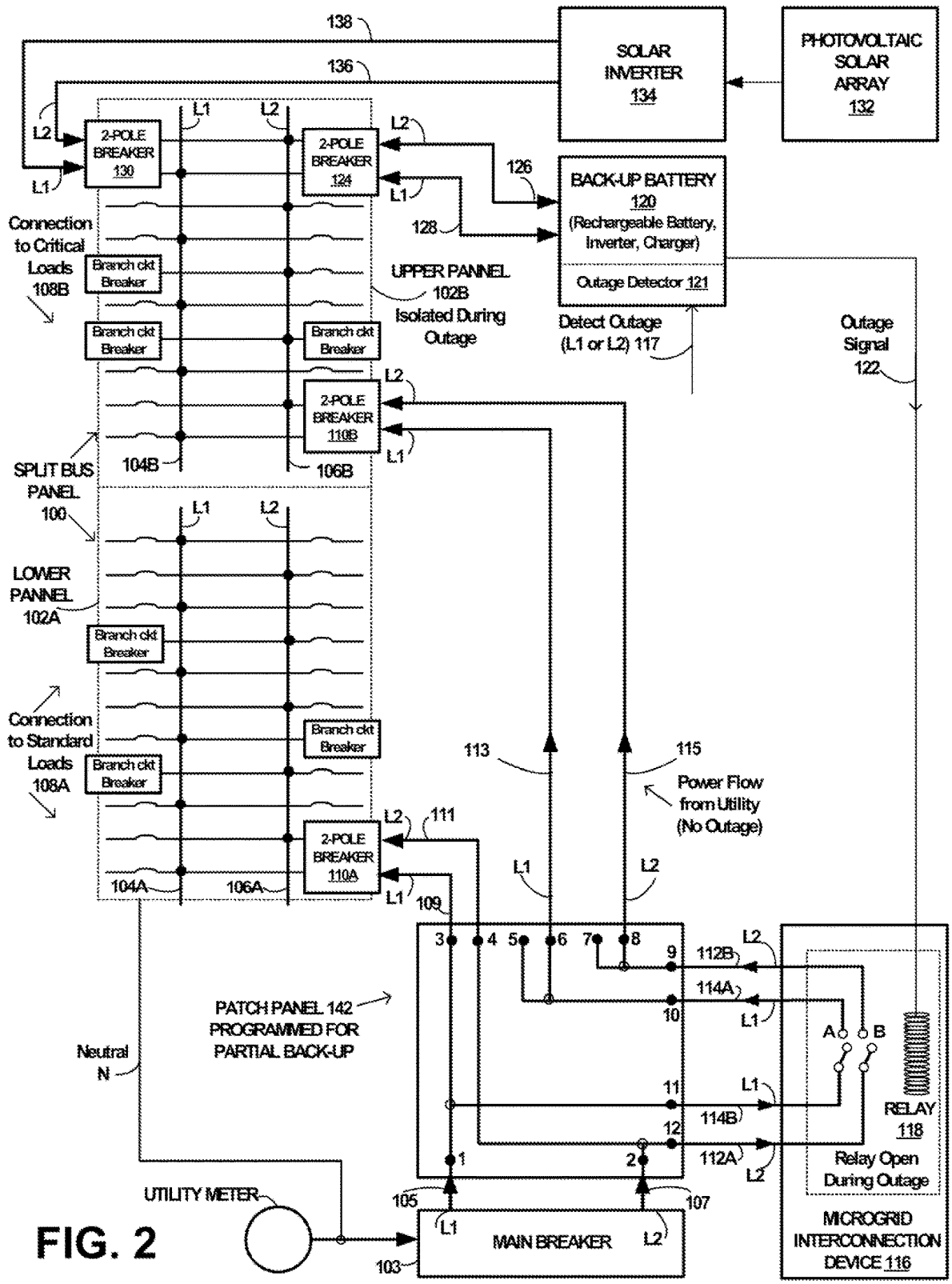
FIG. 2 is circuit and functional block diagram of FIG. 1, wherein the patch panel is configured for partial power back-up of the split-bus panel by powering the first panel section only with utility power and by powering the second panel section with utility power that is backed up with photovoltaic power when there is a utility outage.

FIG. 1 illustrates an example of a single split-bus electrical panel 100 with back-feed circuit breakers 110A and 110B protecting two sections 102A and 102B of the single split bus electrical panel 100, which are connected in parallel. The circuit breakers 110A and 110B are arranged to allow connection of a microgrid interconnection device (MID) 116 (FIG. 2) for isolation of a critical loads section 108B from a standard loads section 108A during a back-up operation due to a utility power outage. The upper or second section 102B is connected through a third back-feed circuit breaker 130 to a photovoltaic power source 132 (FIG. 2). A patch panel 142 is associated with or is a part of the split-bus electrical panel 100. The patch panel 142 includes a plurality of wire termination locations 1-12 interconnected by a plurality of factory pre-wired interconnection wires in the patch panel connected to back-feed circuit breakers 110A and 110B protecting the panel sections 102A and 102B. The patch panel is configured to connect first wire terminations 109 and 111 and second wire terminations 113 and 115 of the respective first and second circuit breakers 110A and 110B to wire termination locations 1-12 interconnected by a plurality of factory installed connections in the patch panel 142, for powering the two panel sections 102A and 102B.

The single split-bus electrical panel apparatus 100 isolates critical electrical loads during a utility power outage, such as freezers, security systems, or electronic medical devices, to enable them to be powered by a renewable energy power source of a back-up system. The back-up system may be powered, for example, by at least one of a photovoltaic solar array 132 or a wind energy array. A first or lower panel section 102A of the split-bus electrical panel 100 supplies power to the non-critical standard loads 108A, such as general lighting, in a residence. A second or upper panel section 102B of the split-bus electrical panel 100 supplies power to the critical loads 108B in the residence, which must continue to be powered during a utility power outage.

In accordance with an example embodiment, a main incoming circuit breaker 103 is connected to an electric power utility that provides 120/240 VAC split phase electrical power for distribution by the split-bus electrical panel 100 to branch circuits of the residence. The utility supplies two 120 VAC phases L1 and L2 that are 180° out of phase with each other (split phases), and a grounded neutral voltage N. The main incoming circuit breaker 103 may be connected to the L1 leg and the L2 leg of the split-phase electrical power, and the grounded neutral voltage N may be connected to a neutral terminal of the split-bus electrical panel 100. The main incoming circuit breaker 103 may have an example rating of 200 Amperes.

The first 120 VAC phase L1 is between the L1 leg and the grounded neutral N, the phase L1 and is connected from the main breaker 103 via line 105 to a wire termination location 1 of patch panel 142 of the split-bus electrical panel 100. The second 120 VAC phase L2 is between the L2 leg and the grounded Neutral N, the phase L2 and is connected from the main breaker 103 via line 107 to a wire termination locations 2 of the patch panel 142. A 240 VAC service may be available between the Leg L1 and the Leg L2 of the split-phase electrical power.

A first two-pole circuit breaker 110A in the first panel section 102A may be oriented as a back feed breaker to connect the L1 bus bar 104A to the L1 phase of a power source and the L2 bus bar 106A to the phase L2 of the power source, such as from the main circuit breaker 103. The first two-pole circuit breaker 110A may have an example rating of 110 Amperes. The first bus bar 104A and the second bus bar 106A in the first panel section 102A, may each have an example bus bar rating of 225 Amperes.

A second two-pole circuit breaker 110B in the second panel section 102B may be oriented as a back feed breaker to connect the L1 bus bar 104B to the L1 phase of a power source and the L2 bus bar 106B to the phase L2 of the power source. The second two-pole circuit breaker 110B may have an example rating of 110 Amperes. The first bus bar 104B and the second bus bar 106B in the second panel section 102B, may each have an example bus bar rating of 225 Amperes.

Figure 3A:
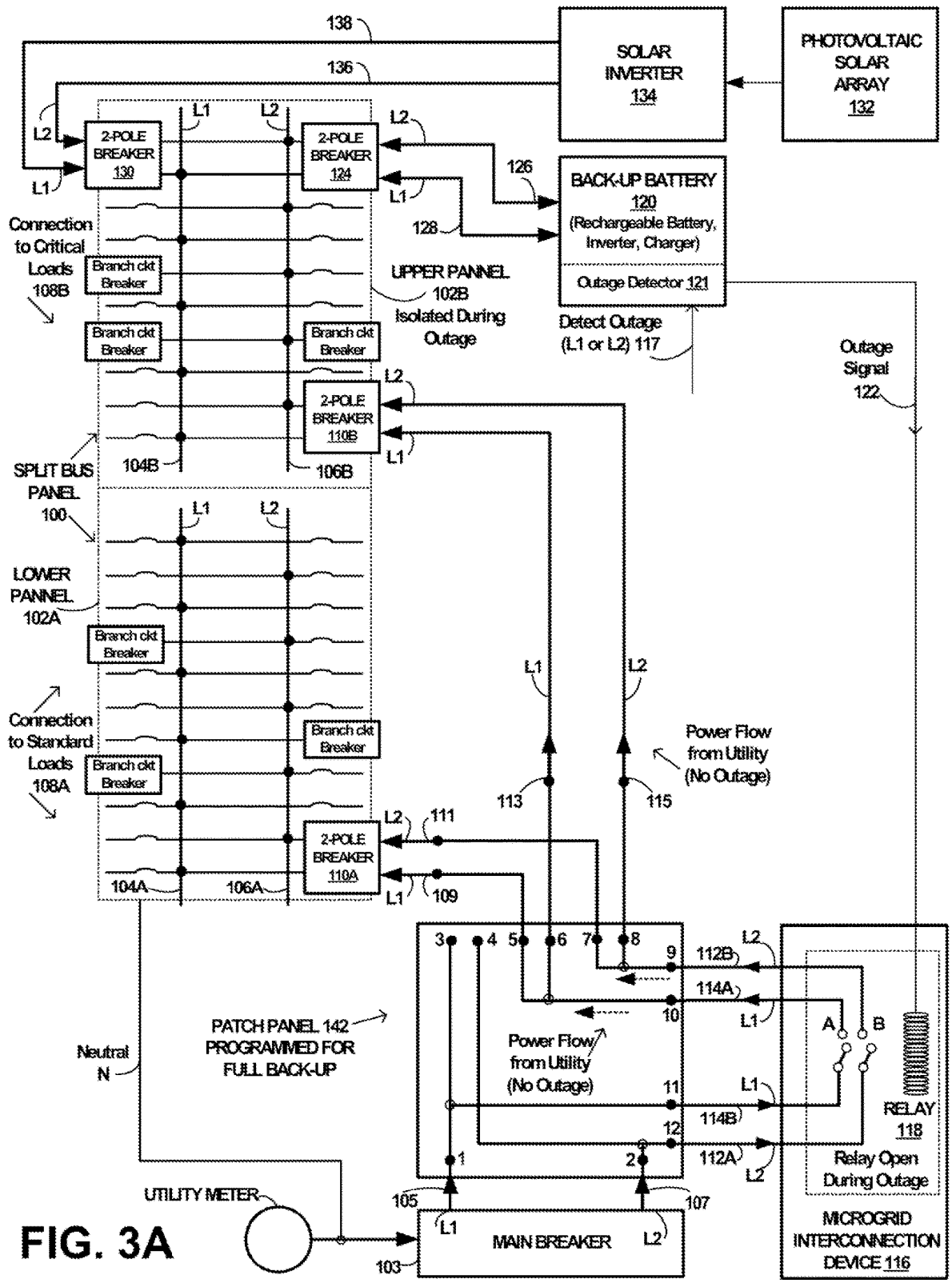
FIG. 3A is a circuit and functional block diagram of FIG. 1, wherein the patch panel is configured for full power back-up of the split-bus panel by powering both the first panel section and the second panel section with utility power that is backed up with photovoltaic power when there is a utility outage. The figure shows the power flow from the relay of the microgrid interconnection device flowing to the first circuit breaker in the first panel section when there is no utility power outage.
Figure 3B:
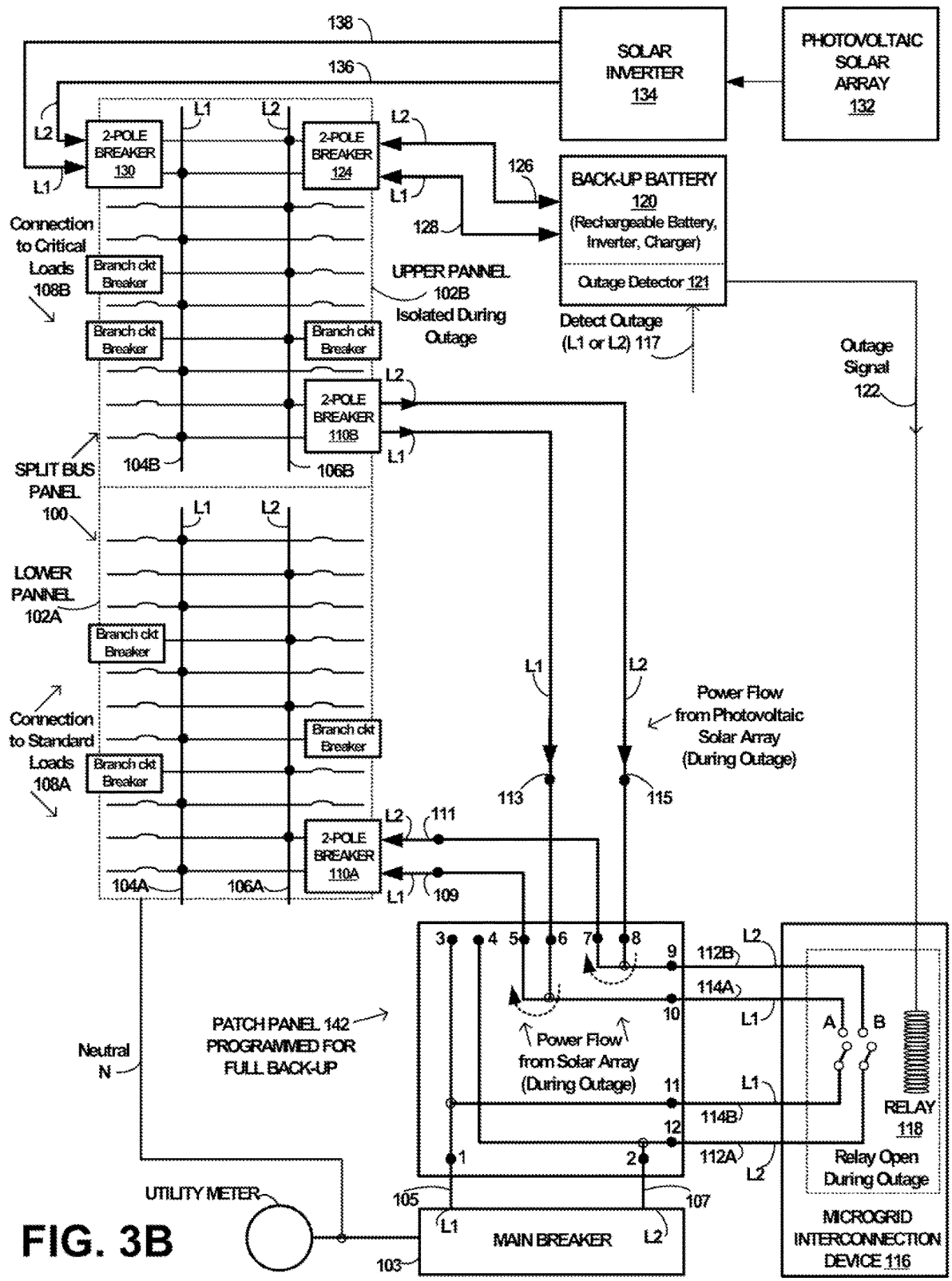
FIG. 3B is circuit and functional block diagram of FIG. 3A, which shows the power flow from the second circuit breaker in the second panel flowing to the first circuit breaker in the first panel section when there is a utility power outage.

A patch panel 142 is associated with or a part of the split-bus electrical panel 100, which includes a plurality of wire termination locations 1-12, which facilitates making changes between a fully backed up system and a partially backed-up system. The patch panel 142 is configured to connect wire terminations 109, 111, 113, and 115 from the back-feed circuit breakers to the wire termination locations 1-12 of the patch panel to either: (1) connect each panel section 102A and 102B directly to utility power from the main breaker 103 for full utility power to both panel sections (FIG. 1); (2) alternately to connect the second panel section 102B to the utility power via a microgrid interconnection device 116 when the second panel section 102B is presently at least partially powered by back-up photovoltaic power source 132 (FIG. 2), or (3) alternately connect both panel sections 102A and 102B to full back-up photovoltaic power from back-up photovoltaic power source 132 (FIGS. 3A and 3B).

The patch panel is shipped from the factory to enable normal utility power and solar power without backup. The patch panel has a first wire termination location 1 connected to an L1 phase of a split phase utility power source, and a second wire termination location 2 connected to an L2 phase of the split phase utility power source. The patch panel is configured to connect the first wire termination location 1 to third 3 and fourth 11 wire termination locations and configured to connect the second wire termination location 2 to fifth 4 and sixth 12 wire termination locations. The patch panel is configured to connect an L1 phase wire termination 109 of the first circuit breaker 110A to the third wire termination location 3 of the patch panel and to connect an L2 wire termination 111 of the first circuit breaker to the fifth wire termination location 4 of the patch panel, to conduct power from the utility power source to the first panel section 102A. The patch panel is configured to connect an L1 phase wire termination 113 of the second circuit breaker 110B to a seventh wire termination location 6 of the patch panel and to connect an L2 wire termination 115 of the second circuit breaker to an eighth wire termination location 8 of the patch panel. The patch panel is configured to connect the seventh wire termination location 6 to a ninth wire termination location 10 and to connect the eighth wire termination location 8 to a tenth wire termination location 9. The patch panel is configured to conduct power from the utility power source to the second panel section 102B, by a first shorting wire 114' between the fourth wire termination location 11 and the ninth wire termination location 10 of the patch panel, and by a second shorting wire 112' between the sixth wire termination location 12 and the tenth wire termination location 9 of the patch panel, to connect each panel section to normal utility power, but without solar power back-up when there is a utility outage.

FIG. 2 is circuit and functional block diagram of FIG. 1, wherein the patch panel is configured for partial power back-up of the split-bus panel by powering the first panel section 102A only with utility power and by powering the second panel section 102B with utility power that is backed up with photovoltaic power when there is a utility outage. In order to provide power to a home during a utility outage, even one that has a solar system, it is necessary to add not only a battery, but also a backup interface that is capable of detecting a utility outage and isolating the home from the utility grid so that the battery and solar inverter can then create a microgrid safely. The isolation is accomplished using a power relay able to meet the specifications of a Microgrid Interface Device according to UL standards and the National Electrical Code (NEC).

The patch panel is configured to enable an installer to selectively connect the second panel section 102B to the utility power via first and second relay switches A and B of a relay 118 in a microgrid interconnection device 116 when the second panel section is presently at least partially powered by back-up photovoltaic power, by enabling the installer to selectively remove the first and second shorting wires from the patch panel. The patch panel is configured to enable the installer to connect a first relay switch A between the fourth wire termination 11 location and the ninth wire termination location 10 of the patch panel, and to selectively connect a second relay B between the sixth wire termination location 12 and the tenth wire termination location 9 of the patch panel. This configuration provides partial power back-up of the split-bus panel by powering the first panel section only with utility power and by powering the second panel section with utility power that is backed up with photovoltaic power when there is a utility outage.

The first and second relay switches A and B in the microgrid interconnection device 116 are coupled to the utility power source and configured to be closed and conduct utility power from the utility power source when there is no utility power outage and to be open when there is a utility power outage.

FIG. 3A is circuit and functional block diagram of FIG. 1, wherein the patch panel is configured for full power back-up of the split-bus panel by powering both the first panel section 102A and the second panel section 102B with utility power that is backed up with photovoltaic power when there is a utility outage. The figure shows the power flow from the relay 118 of the microgrid interconnection device 116 flowing to the first circuit breaker 110A in the first panel section 102A when there is no utility power outage.

FIG. 3B is circuit and functional block diagram of FIG. 3A, which shows the power flow from the second circuit breaker 110B in the second panel 102B flowing to the first circuit breaker 110A in the first panel section 102A when there is a utility power outage.

The patch panel is configured to connect an eleventh wire termination location 5 of the patch panel to the ninth wire termination location 10 and to connect a twelfth wire termination location 7 of the patch panel to the tenth wire termination location 9. The patch panel is configured to enable an installer to selectively move the L1 phase wire termination 109 of the first circuit breaker 110A from the third wire termination location 3 and to connect the L1 phase wire termination 109 of the first circuit breaker 110A to the eleventh wire termination location 5 of the patch panel and to move the L2 wire termination 111 of the first circuit breaker from the fifth wire termination location 4 to the twelfth wire termination location 7 of the patch panel, to conduct power from the photovoltaic power source and from the utility power source to the first panel section 102A, for full power back-up of the split-bus panel by powering both the first panel section and the second panel section with utility power that is backed up with photovoltaic power when there is a utility outage.

The second panel section 102B of the split-bus electrical panel 100 services a back-up system that includes renewable energy power sources such as at least one of a photovoltaic (PV) system or a wind energy system. The photovoltaic (PV) system with a battery back-up, includes a photovoltaic solar array 132, a solar inverter 134, and a back-up battery 120. The back-up battery 120 includes a rechargeable battery, an inverter, a charger, and an outage detector 121. In normal operation when there is no outage of power from the utility, the photovoltaic system with battery back-up supplements the utility power.

The solar inverter 134 receives direct current from the photovoltaic solar array 132 and outputs alternating current over lines 136 and 138 to a third two-pole circuit breaker 130 in the second panel section 102B that may be oriented as a back feed breaker to connect the L1 bus bar 104B and the L2 bus bar 106B to the solar inverter 134. The third two-pole circuit breaker 130 may have an example rating of 60 Amperes. The solar inverter 134 outputs the AC power to the L1 bus bar 104B and the L2 bus bar 106B in the second panel section 102B via the third two-pole circuit breaker 130.

The back-up battery 120 includes an inverter that converts direct current from the rechargeable battery and outputs alternating current to a fourth two-pole circuit breaker 124 in the second panel section 102B that may be oriented as a back feed breaker to connect the L1 bus bar 104B and the L2 bus bar 106B to the inverter of the back-up battery 120. The fourth two-pole circuit breaker 124 may have an example rating of 30 Amperes. The inverter of the back-up battery 120 outputs the AC power over lines 126 and 128 to the fourth two-pole breaker 124 and the L1 bus bar 104B and the L2 bus bar 106B in the second panel section 102B, to supplement any insufficiency in photovoltaic power from the solar inverter 134, if needed. In addition, the back-up battery 120 includes a rechargeable battery and a charger that receives the utility power (or solar power) from the fourth circuit breaker 124 to charge the rechargeable battery when there is no utility power outage.

The backup battery 120 includes an outage detector 121 that may be connected to either the L1 phase or the L2 phase outputs 105 and 107 from the main circuit breaker 103. The outage detector 121 detects when the voltage changes in either or both of L1 phase and L2 phase outputs 105 and 107, indicating an outage of utility power. In response, the outage detector 121 of the back-up battery 120 sends an outage signal 122 to the relay 118 in the microgrid interconnection device 116, causing the relay 118 to open during the outage. When the relay 118 opens, the second panel section 102B may become isolated from the main breaker 103, so that the second panel 102B may be powered only from the solar inverter 134 and the back-up battery 120. This prevents solar power from leaking out through the main breaker 103 onto the utility grid, where it may cause a hazard to utility workers or others, who may come into contact with power lines of the grid.

Branch circuit breakers may, for example, be plugged into either the first L1 bus bar 104A or the second L2 bus bar 106A of the first panel section 102A of the split-bus electrical panel 100, to supply power to various non-critical standard loads 108A of the residence. The first panel section 102A of the split-bus electrical panel 100 has an interleaved type of bus connector arrangement with two columns of branch circuit breakers. Each branch circuit breaker originates on the opposite phase (L1 or L2) from the one above or below it. The 120 VAC branch circuit loads are connected between a breaker on phase L1 bus bar 104A and Neutral N or between a breaker on Phase L2 bus bar 106A and Neutral N. The 240 V branch circuit loads may be connected using a first single-pole breaker on Phase L1 bus bar 104A and a second single-pole breaker Phase L2 bus bar 106A. The branch circuit breakers may have example ratings in a range of 15 to 90 Amperes.

The branch circuit breakers may also, for example, be plugged into either the first L1 bus bar 104B or the second L2 bus bar 106B of the second panel section 102B of the split-bus electrical panel 100, to supply power to various critical loads 108B of the residence. The second panel section 102B of the split-bus electrical panel 100 has an interleaved type of bus connector arrangement with two columns of branch circuit breakers. Each branch circuit breaker originates on the opposite phase (L1 or L2) from the one above or below it. The 120 VAC branch circuit loads are connected between a breaker on phase L1 bus bar 104B and Neutral N or between a breaker on Phase L2 bus bar 106B and Neutral N. The 240 V branch circuit loads may be connected using a first single-pole breaker on Phase L1 bus bar 104B and a second single-pole breaker Phase L2 bus bar 106B. The branch circuit breakers may have example ratings in a range of 15 to 90 Amperes.

In this manner, power may be supplied to the critical loads 108B connected to the second panel 102B, which must continue to be powered during a utility power outage.

When the utility power outage ends and utility power resumes, the outage detector 121 in the back-up battery 120 detects that the voltage has returned to one or both of the L1 phase and L2 phase outputs 105 and 107 of the main breaker 103, indicating that the outage of utility power has ended. In response, the outage detector 121 of the back-up battery 120 sends a signal that the outage has ended, to the relay 118 in the microgrid interconnection device 116, causing the relay 118 to close. When the relay 118 closes, the second panel section 102B may be reconnected to main breaker 103, so that it may be powered by the utility power, as well as being powered by the supplementary power from the solar inverter 134 and the back-up battery 120.

Figure 3C:
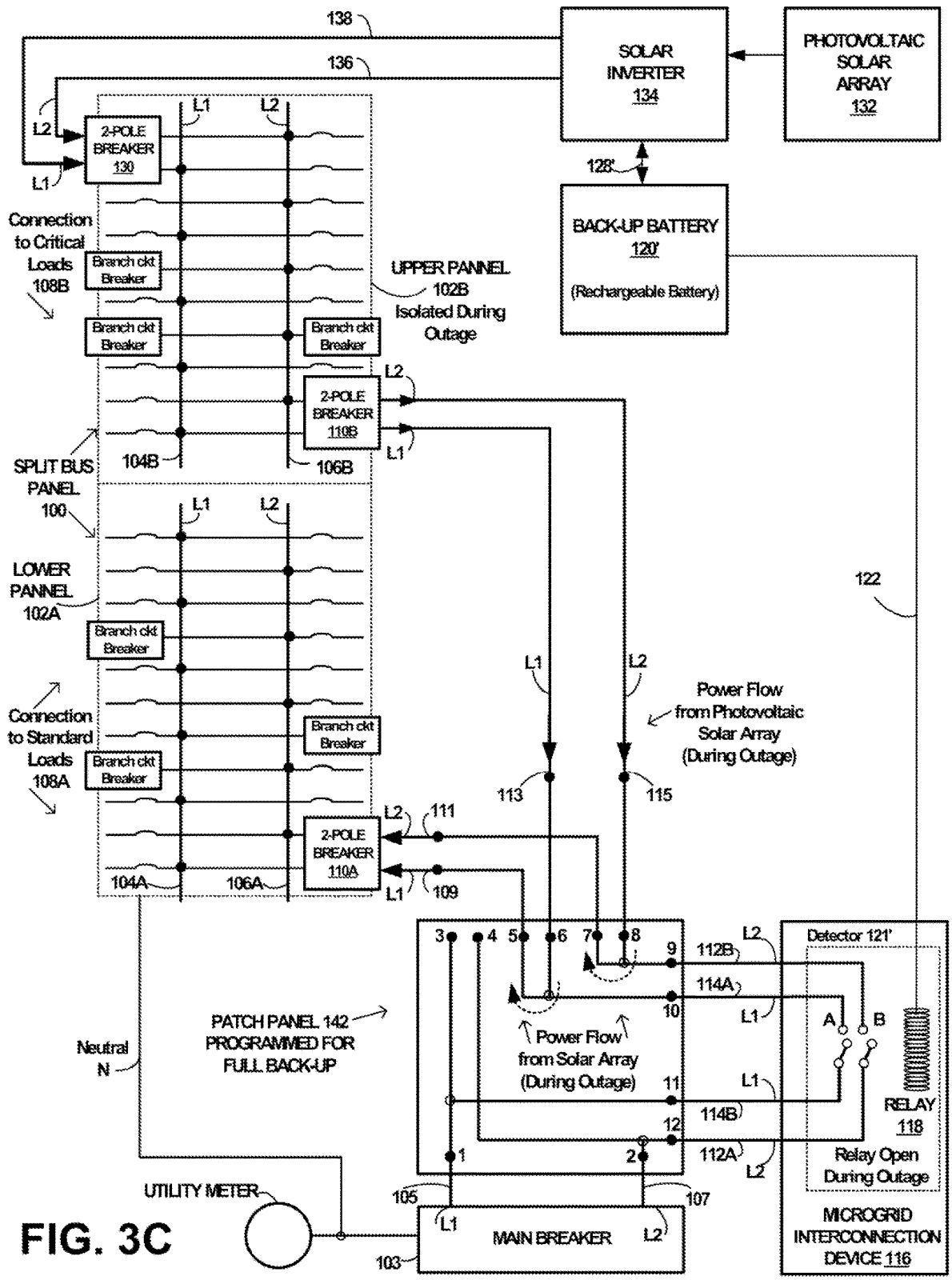
FIG. 3C is a circuit and functional block diagram of FIG. 3B, illustrating an alternate example embodiment of the single split-bus electrical panel 100, wherein a back-up battery may provide back-up direct current to the solar inverter 134, which is combined with the photoelectric direct current from the photovoltaic solar array 132.

FIG. 3C is a circuit and functional block diagram of FIG. 3B, illustrating an alternate example embodiment of the single split-bus electrical panel 100, wherein a back-up battery 120' may provide back-up direct current over line 128' to the solar inverter 134, which is combined with the photoelectric direct current from the photovoltaic solar array 132. The combined currents are converted by the solar inverter 134 to alternating current that is provided over lines 136 and 138 to the third circuit breaker 130. In an alternate example embodiment, the outage detector 121' may be associated with the microgrid connection device 116. The outage detector is configured to detect whether there is a utility power outage and to cause the relay 118 to open when a utility power outage is detected. Battery power from the back-up battery is available to operate the relay 118 during a utility power outage.

Figure 4A:
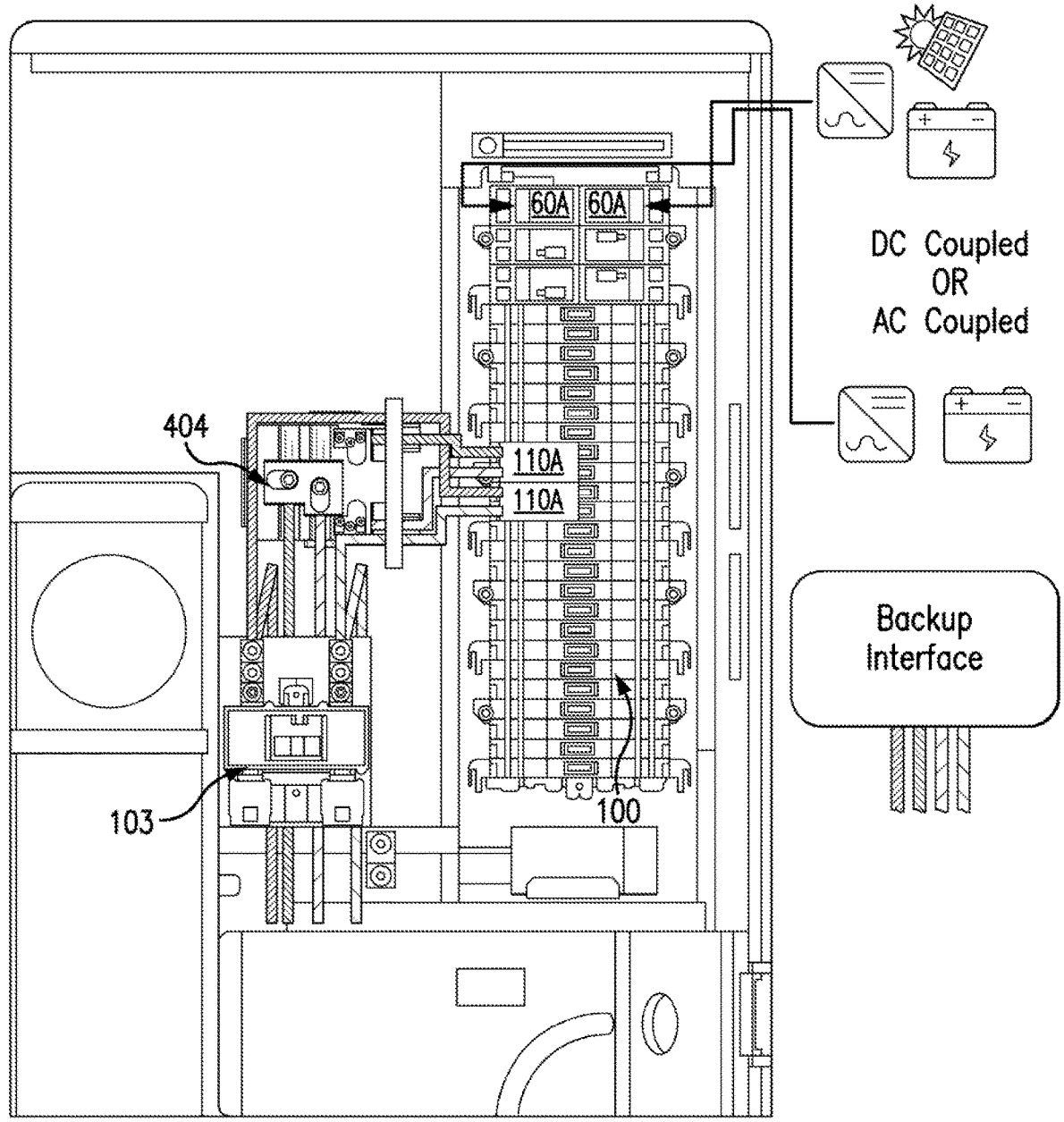
FIGS. 4A to 4D depict a custom power distribution block with lugs serving as the patch panel.
Figure 4B:
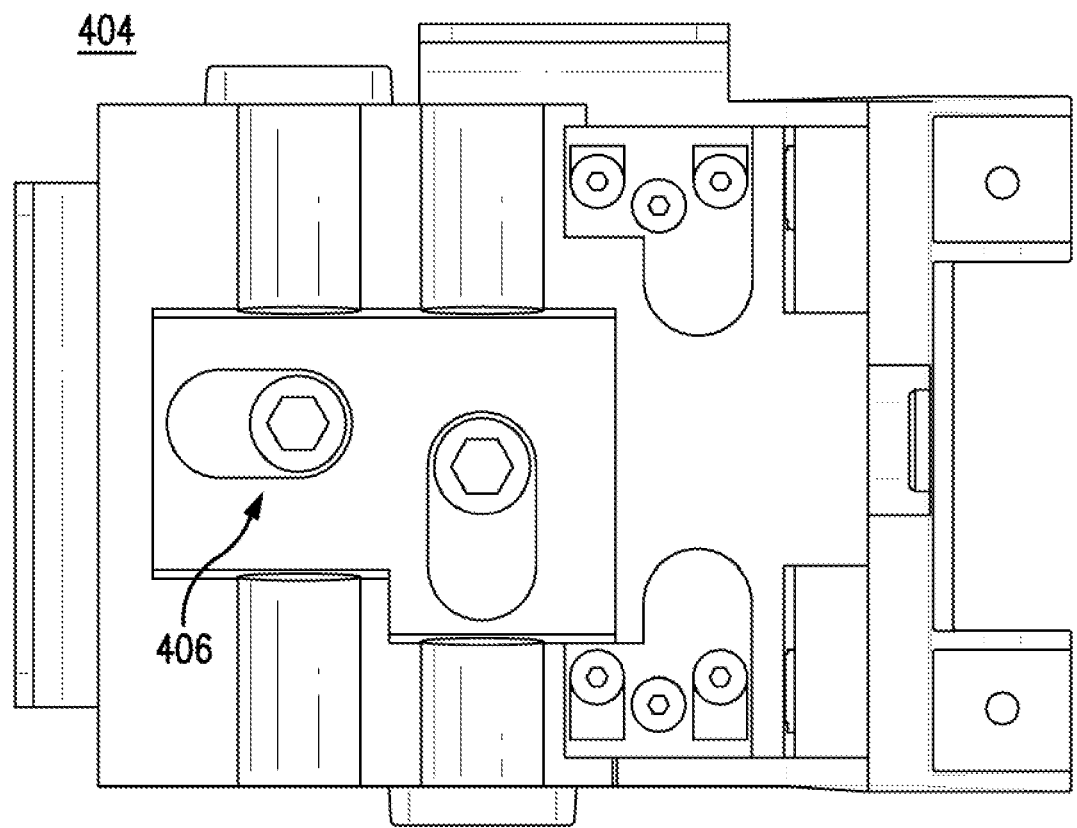
Figure 4C:
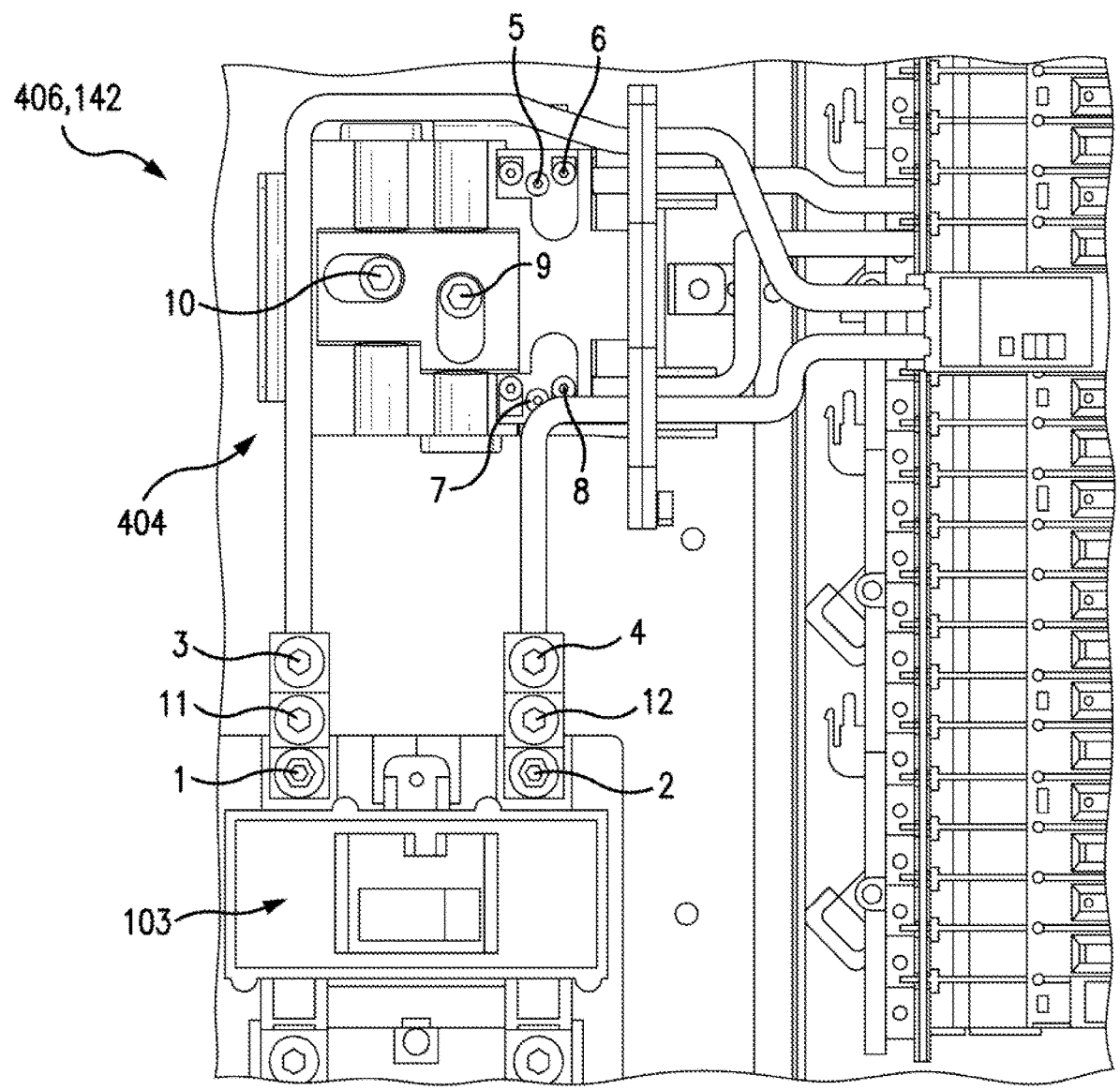
Figure 4D:
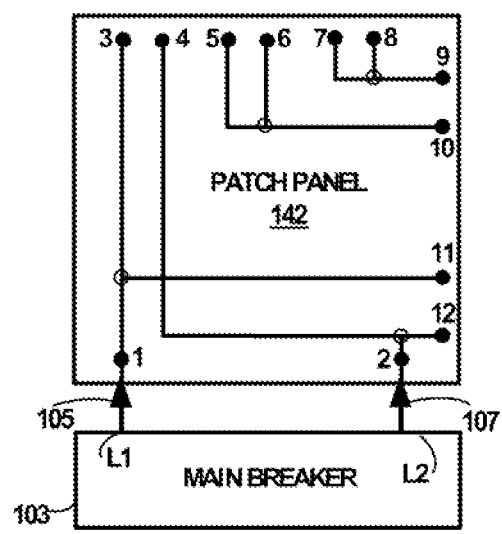

FIGS. 4A to 4D depict a custom power distribution block 404 with lugs 406 serving as the patch panel 142. The custom power distribution block 404 is shown in FIG. 4A as positioned in an electrical load center and connected between the main breaker 103 and the split bus panel 100. The factory installed custom power distribution block 404 is mounted in a space allocated in the in the main load center or electrical panel of a home. The custom power distribution block 404 may be later connected to the microgrid interconnection device 116 and the relay 118 shown in FIGS. 2, 3A and 3B, which may be later installed by an installer when converting the electrical system into a partially backed up or a fully backed up photovoltaic powered system. The custom power distribution block 404 shown in FIG. 4B includes terminal lugs 406 that function as the patch panel 142. The custom power distribution block 404 shown in FIG. 4C identifies how the lugs 406 function as the wire termination locations 1 through 12 shown in the patch panel 142 depicted in FIG. 4D, and also depicted in FIGS. 1, 2, 3A, and 3B. In the illustrated version of the custom power distribution block 404, the multiple wire termination position lugs on the L1 and L2 outputs of the main breaker are also part of the patch panel.

Figure 5A:
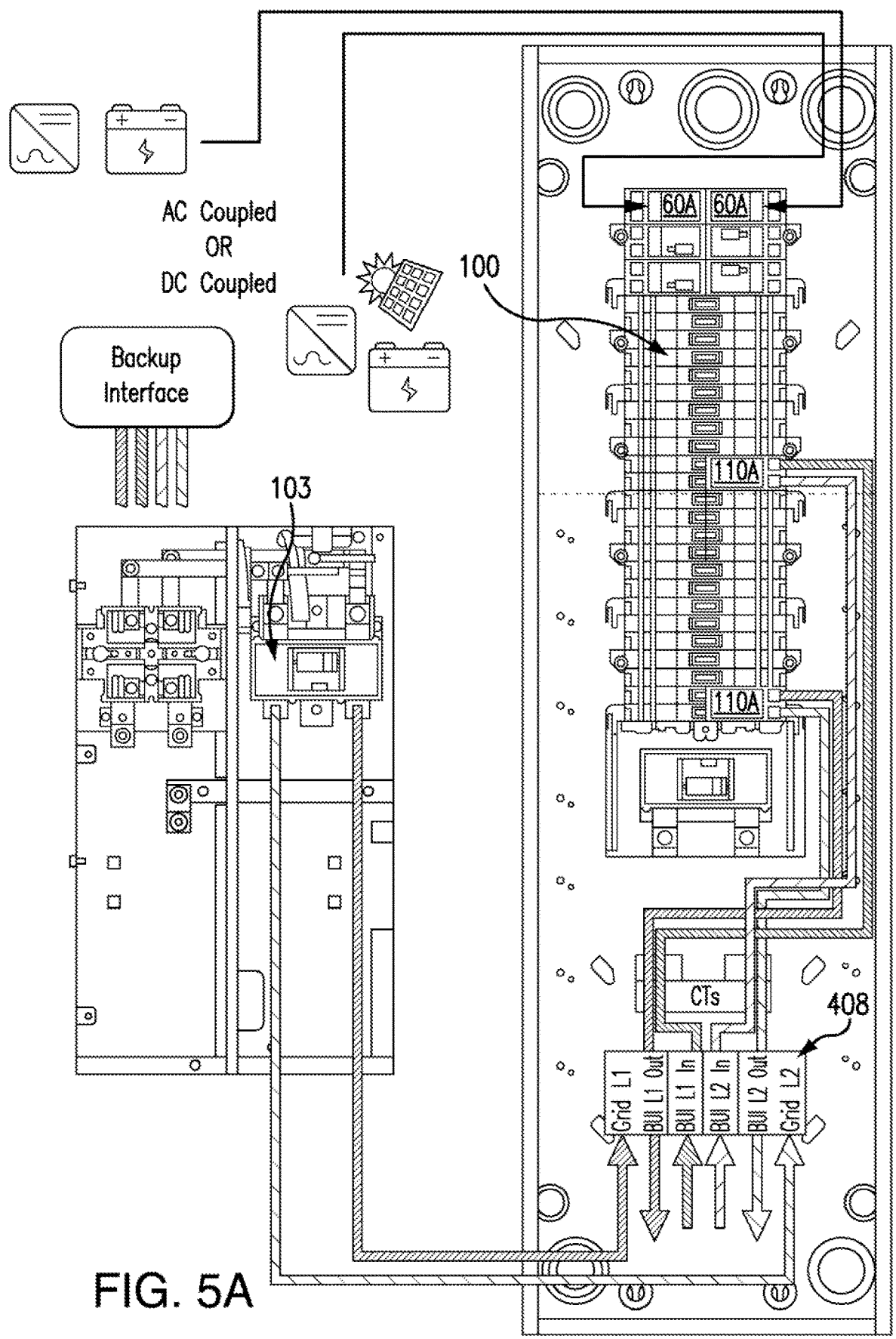
FIGS. 5A to 5D depict a power distribution block with lugs serving as the patch panel.
Figure 5B:
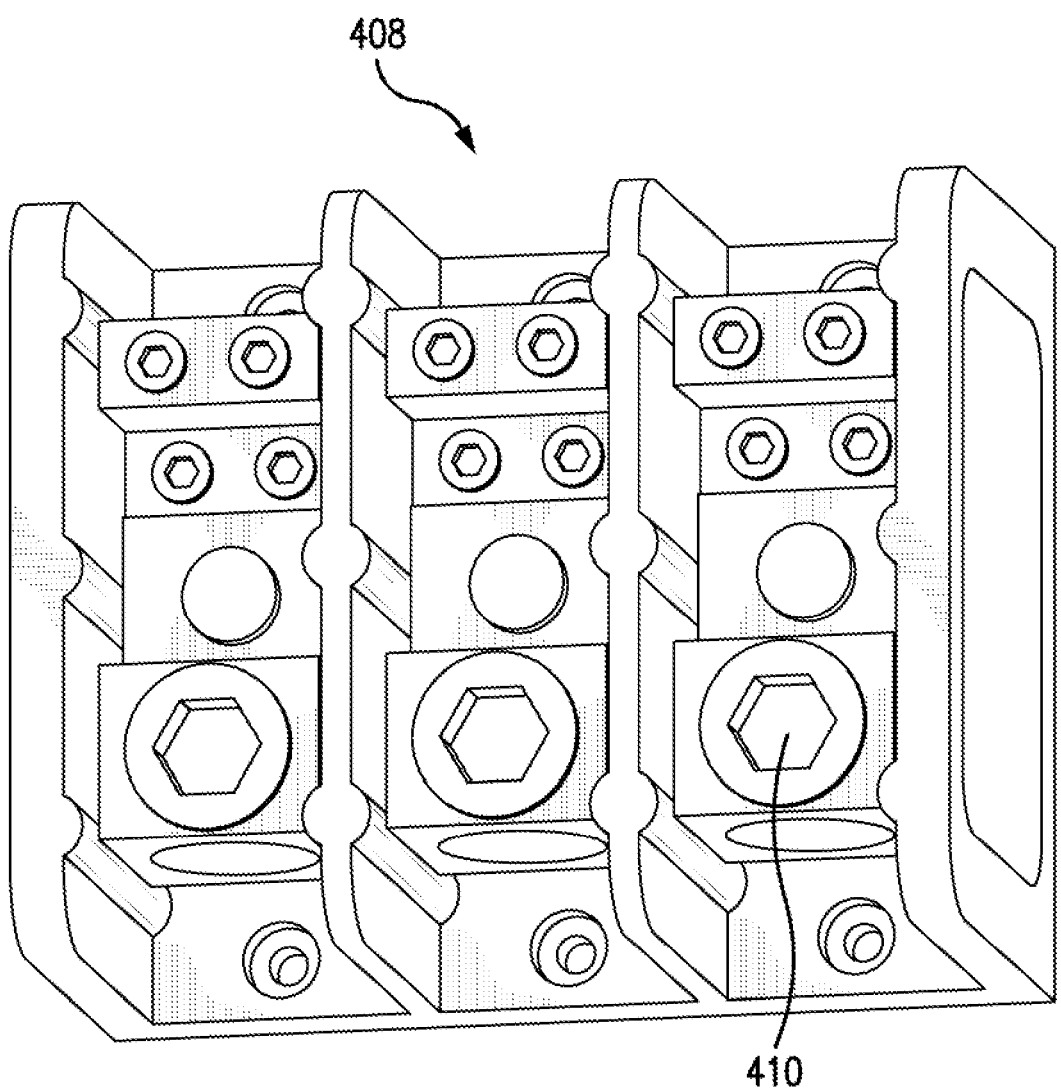
Figure 5C:
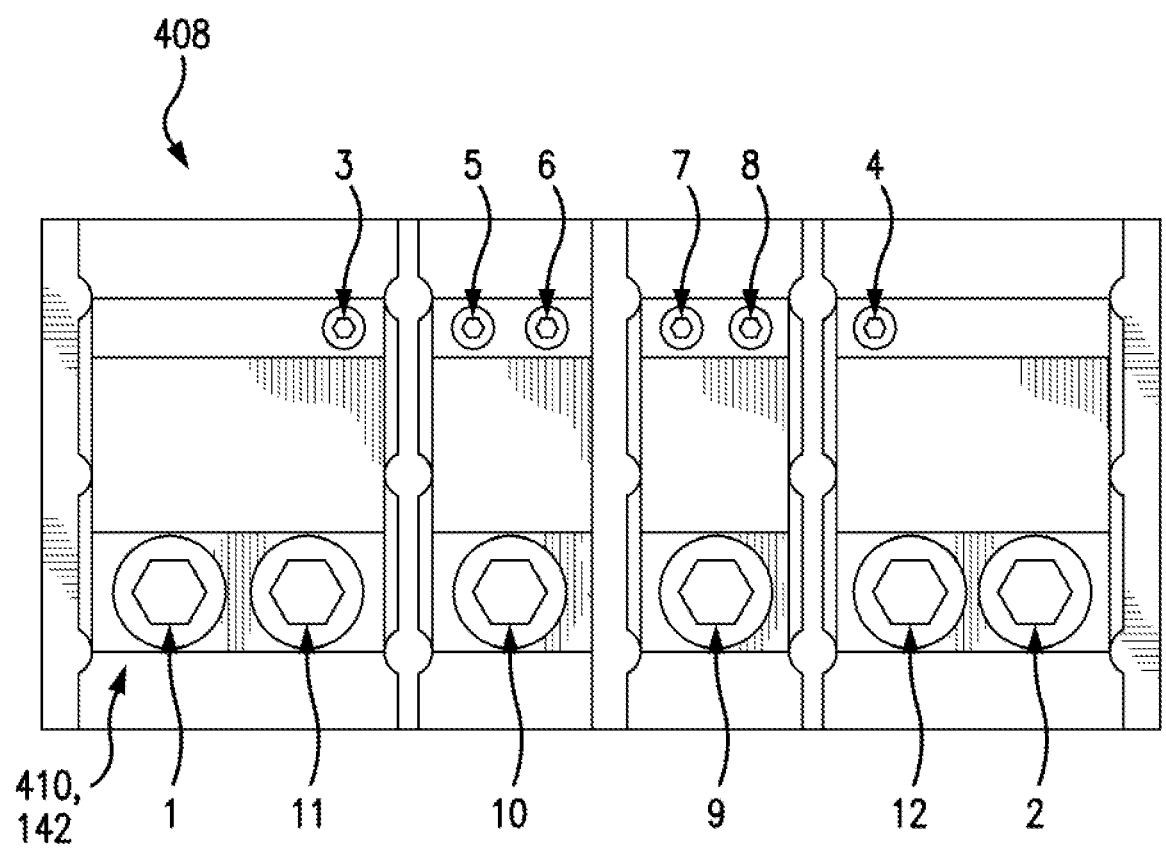
Figure 5D:
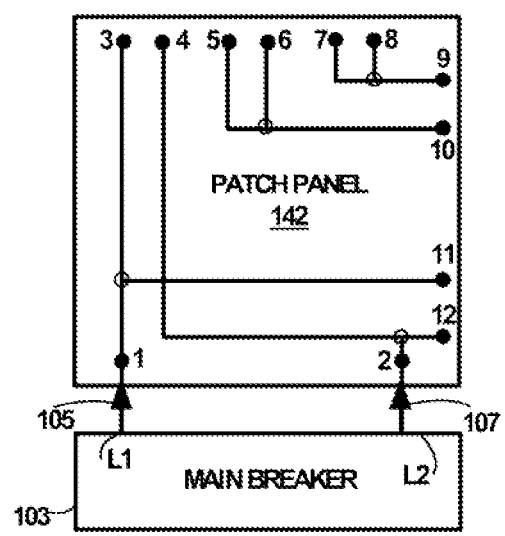

FIGS. 5A to 5D depict a power distribution block 408 with lugs 410 serving as the patch panel 142. The power distribution block 408 is shown in FIG. 5A as positioned in an electrical load center and connected between the main breaker 103 and the split bus panel 100. The factory installed power distribution block 408 is mounted in a space allocated in the in the main load center or electrical panel of a home. The power distribution block 408 may be later connected to the microgrid interconnection device 116 and the relay 118 shown in FIGS. 2, 3A and 3B, which may be later installed by an installer when converting the electrical system into a partially backed up or a fully backed up photovoltaic powered system. The power distribution block 408 shown in FIG. 5B includes terminal lugs 410 that function as the patch panel 142. The power distribution block 408 shown in FIG. 5C identifies how the lugs 410 function as the wire termination locations 1 through 12 shown in the patch panel 142 depicted in FIG. 5D, and also depicted in FIGS. 1, 2, 3A, and 3B.

The resulting apparatus, system, and method connect the two panel sections of the split bus in parallel, providing a convenient way for the installer implement either a partial back-up system or full back-up system at the time the home is being built, and moreover, to enable an electrician to later change the system, if desired by the home owner.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus for providing full or partial back-up power of a photovoltaic system to power critical loads during a utility power outage, comprising:
    a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;
    a first circuit breaker in the first panel section connected to a first bus bar and a second bus bar of the first panel section, and connected to a first pair of wire terminations, the first circuit breaker configured to conduct power from a power source connected via the first pair of wire terminations;
    a second circuit breaker in the second panel section connected to a first bus bar and a second bus bar of the second panel section, and connected to a second pair of wire terminations, the second circuit breaker configured to conduct power from a power source via the second pair of wire terminations; and
    a power wiring patch panel associated with the split-bus electrical panel, including a plurality of wire termination locations, the power wiring patch panel configured to enable an installer to selectively connect the first and second pairs of wire terminations to selected wire termination locations of the patch panel to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

2. The apparatus of claim 1, wherein the patch panel has a first wire termination location connected to an L1 phase of a split phase utility power source, and a second wire termination location connected to an L2 phase of the split phase utility power source;
    wherein the patch panel is configured to connect the first wire termination location to third and fourth wire termination locations and configured to connect the second wire termination location to fifth and sixth wire termination locations;
    wherein the patch panel is configured to connect an L1 phase wire termination of the first circuit breaker to the third wire termination location of the patch panel and to connect an L2 wire termination of the first circuit breaker to the fifth wire termination location of the patch panel, to conduct power from the utility power source to the first panel section;
    wherein the patch panel is configured to connect an L1 phase wire termination of the second circuit breaker to a seventh wire termination location of the patch panel and to connect an L2 wire termination of the second circuit breaker to an eighth wire termination location of the patch panel;
    wherein the patch panel is configured to connect the seventh wire termination location to a ninth wire termination location and to connect the eighth wire termination location to a tenth wire termination location;
    wherein the patch panel is configured to conduct power from the utility power source to the second panel section, by a first shorting wire between the fourth wire termination location and the ninth wire termination location of the patch panel, and by a second shorting wire between the sixth wire termination location and the tenth wire termination location of the patch panel, to connect each panel section to normal utility power, but without solar power back-up when there is a utility outage.

3. The apparatus of claim 2, wherein the patch panel is configured to enable an installer to selectively connect the second panel section to the utility power via first and second relay switches of a relay in a microgrid interconnection device when the second panel section is presently at least partially powered by back-up photovoltaic power, by enabling the installer to selectively remove the first and second shorting wires from the patch panel and enable the installer to connect a first relay switch between the fourth wire termination location and the ninth wire termination location of the patch panel, and by enabling the installer to selectively connect a second relay between the sixth wire termination location and the tenth wire termination location of the patch panel, for partial power back-up of the split-bus panel by powering the first panel section only with utility power and by powering the second panel section with utility power that is backed up with photovoltaic power when there is a utility outage.

4. The apparatus of claim 3, wherein the first and second relay switches in the microgrid interconnection device are coupled to the utility power source and configured to be closed and conduct utility power from the utility power source when there is no utility power outage and to be open when there is a utility power outage.

5. The apparatus of claim 3, wherein the patch panel is configured to connect an eleventh wire termination location of the patch panel to the ninth wire termination location and to connect a twelfth wire termination location of the patch panel to the tenth wire termination location;
wherein the patch panel is configured to enable an installer to selectively move the L1 phase wire termination of the first circuit breaker from the third wire termination location and to connect the L1 phase wire termination of the first circuit breaker to the eleventh wire termination location of the patch panel and to move the L2 wire termination of the first circuit breaker from the fifth wire termination location to the twelfth wire termination location of the patch panel, to conduct power from the photovoltaic power source and from the utility power source to the first panel section, for full power back-up of the split-bus panel by powering both the first panel section and the second panel section with utility power that is backed up with photovoltaic power when there is a utility outage.

6. The apparatus of claim 1, wherein the back-up system includes a back-up power source that includes a rechargeable battery, a charger, an inverter, and an outage detector that is configured to detect when there is a utility power outage and send an outage signal to the relay.

7. The apparatus of claim 1, wherein an outage detector is associated with the microgrid connection device and is configured to detect whether there is a utility power outage and to cause a relay to open when a utility power outage is detected.

8. A system for providing full or partial back-up power of a photovoltaic system to power critical loads during a utility power outage, comprising:
a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;
a first circuit breaker in the first panel section connected to a first bus bar and a second bus bar of the first panel section, and connected to a first pair of wire terminations, the first circuit breaker configured to conduct power from a power source connected via the first pair of wire terminations;
a second circuit breaker in the second panel section connected to a first bus bar and a second bus bar of the second panel section, and connected to a second pair of wire terminations, the second circuit breaker configured to conduct power from a power source via the second pair of wire terminations; and
a power wiring patch panel associated with the split-bus electrical panel, including a plurality of wire termination locations, the power wiring patch panel configured to enable an installer to selectively connect the first and second pairs of wire terminations to selected wire termination locations of the patch panel to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

9. The system of claim 8, wherein the patch panel has a first wire termination location connected to an L1 phase of a split phase utility power source, and a second wire termination location connected to an L2 phase of the split phase utility power source;
wherein the patch panel is configured to connect the first wire termination location to third and fourth wire termination locations and configured to connect the second wire termination location to fifth and sixth wire termination locations;
wherein the patch panel is configured to connect an L1 phase wire termination of the first circuit breaker to the third wire termination location of the patch panel and to connect an L2 wire termination of the first circuit breaker to the fifth wire termination location of the patch panel, to conduct power from the utility power source to the first panel section;
wherein the patch panel is configured to connect an L1 phase wire termination of the second circuit breaker to a seventh wire termination location of the patch panel and to connect an L2 wire termination of the second circuit breaker to an eighth wire termination location of the patch panel;
wherein the patch panel is configured to connect the seventh wire termination location to a ninth wire termination location and to connect the eighth wire termination location to a tenth wire termination location;
wherein the patch panel is configured to conduct power from the utility power source to the second panel section, by a first shorting wire between the fourth wire termination location and the ninth wire termination location of the patch panel, and by a second shorting wire between the sixth wire termination location and the tenth wire termination location of the patch panel, to connect each panel section to normal utility power, but without solar power back-up when there is a utility outage.

10. The system of claim 9, wherein the patch panel is configured to enable an installer to selectively connect the second panel section to the utility power via first and second relay switches of a relay in a microgrid interconnection device when the second panel section is presently at least partially powered by back-up photovoltaic power, by enabling the installer to selectively remove the first and second shorting wires from the patch panel and enable the installer to connect a first relay switch between the fourth wire termination location and the ninth wire termination location of the patch panel, and by enabling the installer to selectively connect a second relay between the sixth wire termination location and the tenth wire termination location of the patch panel, for partial power back-up of the split-bus panel by powering the first panel section only with utility power and by powering the second panel section with utility power that is backed up with photovoltaic power when there is a utility outage.

11. The system of claim 10, wherein the first and second relay switches in the microgrid interconnection device are coupled to the utility power source and configured to be closed and conduct utility power from the utility power source when there is no utility power outage and to be open when there is a utility power outage.

12. The system of claim 10, wherein the patch panel is configured to connect an eleventh wire termination location of the patch panel to the ninth wire termination location and to connect a twelfth wire termination location of the patch panel to the tenth wire termination location;

wherein the patch panel is configured to enable an installer to selectively move the L1 phase wire termination of the first circuit breaker from the third wire termination location and to connect the L1 phase wire termination of the first circuit breaker to the eleventh wire termination location of the patch panel and to move the L2 wire termination of the first circuit breaker from the fifth wire termination location to the twelfth wire termination location of the patch panel, to conduct power from the photovoltaic power source and from the utility power source to the first panel section, for full power back-up of the split-bus panel by powering both the first panel section and the second panel section with utility power that is backed up with photovoltaic power when there is a utility outage.

13. The system of claim 8, wherein the back-up system includes a back-up power source that includes a rechargeable battery, a charger, an inverter, and an outage detector that is configured to detect when there is a utility power outage and send an outage signal to the relay.

14. The system of claim 8, wherein an outage detector is associated with the microgrid connection device and is configured to detect whether there is a utility power outage and to cause a relay to open when a utility power outage is detected.

15. The system of claim 8, wherein the patch panel is a custom power distribution block with terminal lugs that function as the patch panel wire termination locations, which enable an installer to selectively connect the first and second wire terminations to selected wire termination locations of the lugs to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

16. The system of claim 8, wherein the patch panel is a power distribution block with terminal lugs that function as the patch panel wire termination locations, which enable an installer to selectively connect the first and second wire terminations to selected wire termination locations of the lugs to either: (1) connect each panel section directly to utility power for full utility power to both panel sections; (2) alternately to connect the second panel section to the utility power via a microgrid interconnection device when the second panel section is presently at least partially powered by back-up photovoltaic power, or (3) alternately connect both panel sections to full back-up photovoltaic power.

* * * * *